March 20, 1934.  G. N. ALBREE  1,951,641
OIL BURNER
Filed May 4, 1929    2 Sheets-Sheet 1

Inventor
George N. Albree
by Heard Smith & Tennant
Attys.

March 20, 1934.   G. N. ALBREE   1,951,641
OIL BURNER
Filed May 4, 1929   2 Sheets-Sheet 2
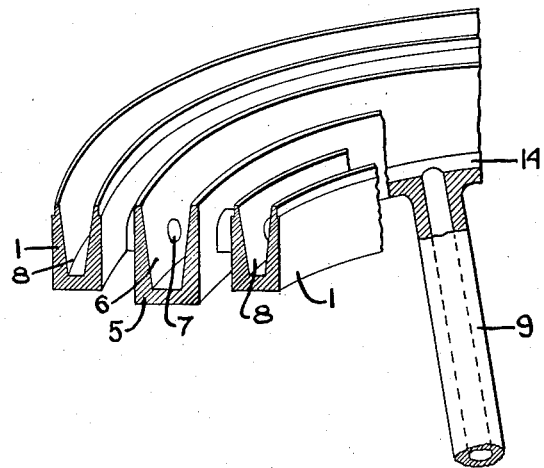
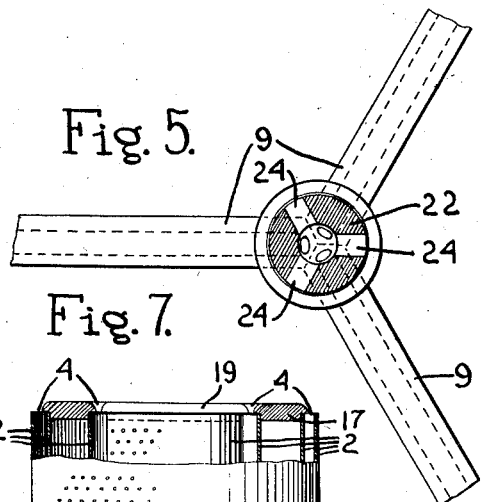
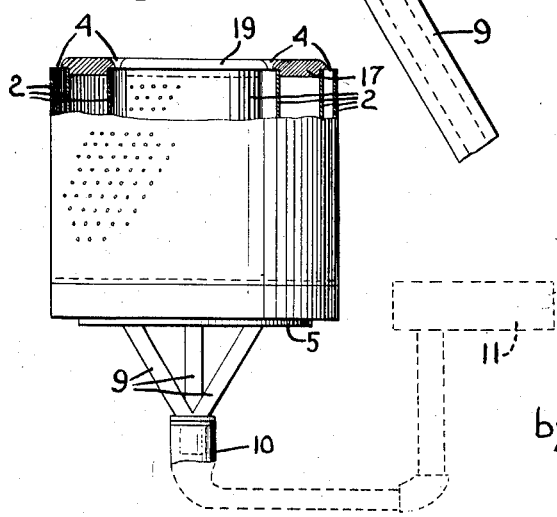
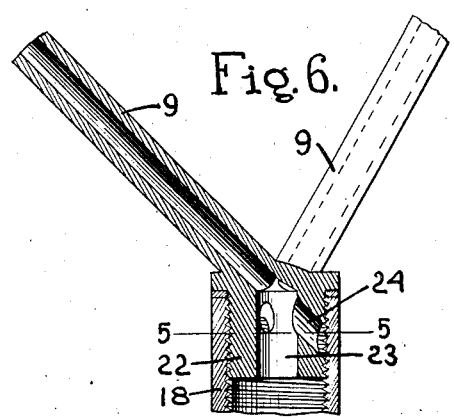
Inventor
George N. Albree
by Heard Smith & Tennant
Attys.

Patented Mar. 20, 1934

1,951,641

UNITED STATES PATENT OFFICE 1,951,641

OIL BURNER

George Norman Albree, Concord, Mass.

Application May 4, 1929, Serial No. 360,427

11 Claims. (Cl. 158—87)

This invention relates to oil burners and has for its general object to provide a novel oil burner which is simple in construction but extremely efficient in operation.

Other objects of the invention are to provide a novel oil burner in which the oil is completely gasified before it is delivered to the burner element with the result that the burner will operate without appreciable carbonization.

Still another object of the invention is to provide a novel gasifying element for gasifying or volatilizing the oil prior to its delivery to the burner element and which is provided with a gas-producing chamber and a heat storage element that accumulates heat from the burner element and radiates said heat to the oil in the gas-producing chamber thereby securing efficient gasification of the oil.

A still further object of the invention is to provide a novel construction of gas-producing chamber which can be easily opened to provide access to its interior for cleaning from the walls of the chamber any carbon deposit which may accumulate thereon.

Another object of the invention is to provide a novel oil feed which is so constructed as to permit it to be easily cleaned in case it begins to carbonize.

Other objects of the invention are to improve generally oil burners in various respects all as will be more fully hereinafter set forth.

In the drawings wherein I have illustrated a selected embodiment of my invention, Fig. 1 is a top plan view of an oil burner embodying the invention with parts broken out;

Fig. 4 is a fragmentary sectional perspective view illustrating the relation between the base portions of the gas producing chamber and the burner elements;

Fig. 5 is a section on the line 5—5, Fig. 6 looking upwardly;

Fig. 6 is a view partly in section of the oil feed;

Fig. 7 is a general view of the complete burner with a part broken out.

Figure 1:
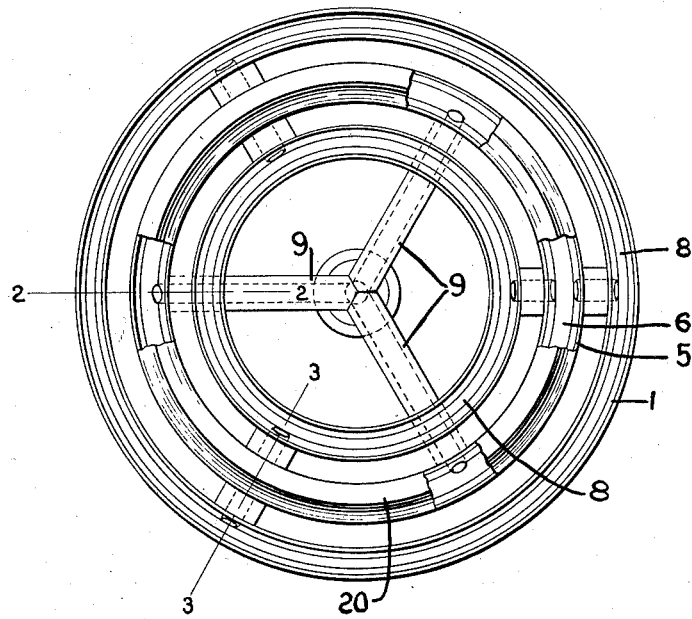
Figure 2:
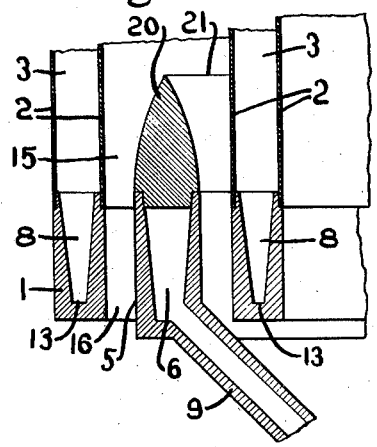
Fig. 2 is a fragmentary enlarged sectional view on the line 2—2, Fig. 1.
Figure 3:
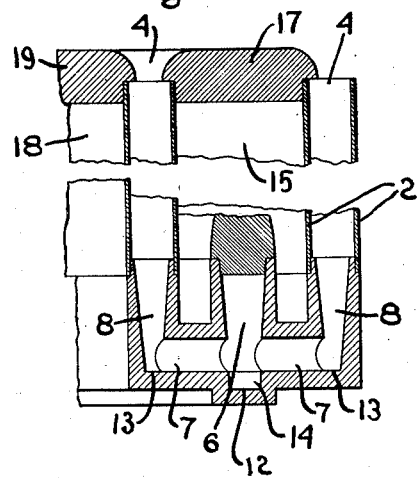
Fig. 3 is an enlarged sectional view on the line 3—3, Fig. 1.

My improved burner comprises one or more burner elements each presenting a trough-shaped base and perforated walls or shells rising from the sides thereof which walls form between them a combined mixing chamber and combustion chamber that terminates at its top in an opening and a gas-producing chamber situated between the burner elements and communicating therewith together with means for feeding oil to the gas-producing chamber.

In the illustrated embodiment of my invention the gas-producing chamber and the burner chamber are annular in shape, this form of burner being one which is best suited for domestic use. The invention, however, is not limited to the particular shape of the burners and hence the burner elements and the gas-producing element may have other shapes than an annular shape without in any way affecting the invention. Furthermore, in the construction shown I have illustrated two burner elements with a gas-producing element between them but the number of burner elements and gas-producing elements may also be varied without departing in any way from the invention.

As stated above each burner element comprises a U-shaped base member indicated at 1 in the drawings and a perforated wall 2 rising from each side of the base member, said walls forming between them a chamber 3 which terminates at its upper end in an opening 4 and is a combined mixing chamber and combustion chamber. Situated between the burner elements is the gas-producing member 5 which is provided with a retort chamber 6 in which the oil is gasified.

The member 5 and the trough-shaped base portions 1 of the burner elements may conveniently be formed as an integral casting. This casting will be provided with the communicating passages 7 which form communication between the gas-producing chamber 6 and the trough-shaped chambers 8 of the burner elements. Any number of these communicating passages 7 may be employed depending on the size of the burner and other requirements of use.

The oil is fed to the gas-producing chamber 6 through one or more feed pipes 9, three being herein shown, which lead to a common supply pipe 10, this supply pipe being connected with a source of oil supply 11 which will preferably be arranged so that the oil will flow from the tank or source of supply 11 to the chamber 6 by gravity.

The floor 12 of the gas-producing chamber 6 is at a lower level than the floor 13 of each of the chambers 8 so that the chamber 6 will present an oil-receiving groove 14 which is below the level of the floors of the chambers 8.

The space 15 between the burner elements is open to the atmosphere at its under side as shown at 16 and at its upper side this space is closed by an annular cap member 17 which rests on the perforated walls 2. The space 18 within the inner wall 2 is also open to the atmosphere at its lower side and this space is closed at its top by the cap member 19 which is removable.

The perforated walls 2 are made separate from the base member 1 and are removably supported thereby, said walls being conveniently made of sheet metal which is provided with the desirable perforations. The cap members 17 and 19 are also removably carried by the perforated walls 2 so that the cap members and the sheet metal walls 2 can be readily removed from the base to give access to the parts or for cleaning purposes.

The member 5 containing the gas-producing chamber 6 is constructed so as to provide easy access to said chamber for cleaning it in case any deposit of carbon accumulates on the wall or floor thereof. The top of the chamber 6 is formed from a removable annular cap member 20, which rests on and is readily removable from the trough-shaped body of the member 5. The cap member 20 can thus be readily lifted off from the body of the gas-producing member 5 thus opening the chamber 6 at the top throughout its length, and when this has been done the walls and floor of the chamber 6 can be readily cleaned from any carbon deposit which may have accumulated thereon.

The cap member 20 not only makes a removable closure for the upper side of the chamber 6 but also constitutes a heat-accumulating element which accumulates heat from the burner elements and then radiates said heat to the oil in the chamber 6 thus facilitating the gasifying operation. This cap member 20 is made relatively thick in a vertical direction and thus contains a surplus of metal. It will preferably have a general taper shape, the sides thereof meeting at the apex 21. This provides a cap member which has a relatively large surface exposed to the heat of the burner elements so that said member 20 will become rapidly heated.

The heat which accumulates in the member 20 will be radiated into the chamber 6 and will thus be effective in rapidly gasifying the oil which covers the floor of the chamber 6. Because of the mass of material in this element 20 it retains a considerable amount of heat and thus maintains a relatively even radiation of heat to the chamber 6 regardless of any fluctuations in the operation of the burner.

The connection between the feed pipes 9 and the supply pipe 10 has been specially made with a view to facilitating the cleaning of the pipes 9. As herein shown these feed pipes 9 all lead to the hub 22 having the intake port 23 with which the interior of each pipe communicates. This hub 22 is screw-threaded to the pipe connection 10. The feed pipes 9 extend at an angle to the hub 22 and the hub is provided with ducts or passages 24 in line with the bore of the pipes 9. These ducts 24 are for the purpose of facilitating the cleaning of the pipes.

If any pipe becomes clogged by the presence of carbon deposit the supply pipe 10 may be uncoupled from the hub 22 and then a drill or any other implement may be introduced through the ducts 24 and thus into the aligned pipes 9 thereby cleaning the pipes and removing any carbon deposit.

The operation of the burner will be readily understood from the foregoing. In order to start the burner the oil is admitted to the gas-producing chamber 6 in sufficient quantities so that it will overflow into the chambers 8 of the burner elements. The oil in the chambers 8 is then lighted and as it burns the heat thereof will gradually heat the walls of the gas-producing chamber 6 and the cap member 20.

After a few minutes the gas-producing chamber 6 will become sufficiently hot so that the oil therein will be gasified, the gas passing through the ducts or passages 7 into the chambers 8 and thence into the chambers 3, where it is mixed with the air and burned.

Under normal conditions the combustion of the gas takes place largely, if not entirely, in the chambers 3, the air being admitted to said chambers through the perforations in the walls 2 in sufficient quantity to support combustion in said chamber. If, however, the oil is being fed to the burner in increased quantities then the air which is admitted through the openings in the walls 2 may not be sufficient in quantity so that combustion will be complete in the chambers 3, in which case the flame will rise through the openings 4. It will be understood, of course, that the supply 10 will be provided with a suitable valve for controlling the supply of oil to the gas-producing chamber and by which said supply may be regulated.

During the normal operation of the burner the oil will be supplied to the gas-producing chamber only as fast as it is burned and in just sufficient quantities so that there will always be a thin layer of oil on the floor of said chamber 6, the depth of oil at this point being insufficient to flow into the chambers 8 of the burner elements. Hence the oil will become gasified almost as soon as it enters the gas-producing chamber.

The oil supply will preferably be so arranged that the oil level can never rise in the chamber 6 to a point where it will fill the chamber so that even if the burner should go out the oil would never overflow the trough-shaped chambers 6 and 8.

I claim:

1. In an oil burner, the combination with two burner elements each presenting a trough-shaped base and a perforated wall rising from each side of the base, the perforated walls of each burner element forming between them a combined mixing and combustion chamber which terminates at its top in an opening, of a gas-producing chamber situated between but extending to a lower level than said burner elements and communicating with both, and means to feed oil to said gas-producing chamber, one wall of said chamber having extra thickness and constituting a heat storage element which accumulates heat from the burner elements and radiates said heat to the oil delivered to the gas-producing chamber.

2. In an oil burner, the combination with two annular burning elements each presenting a trough-shaped base and a perforated wall rising from each side thereof, the walls of each burner element forming between them an annular combined mixing and combustion chamber which terminates at its top in an annular opening, of an annular gas-producing chamber situated between the burner elements and communicating with both, and means to feed oil to said gas-producing chamber, the top wall of the gas-producing chamber having extra thickness and constituting a heat storage element which accumulates heat from the burner elements and radiates said heat to the oil delivered to the gas-producing chamber.

3. In an oil burner, the combination with burner elements, each presenting a trough-shaped base and a perforated wall rising from each side thereof, the perforated walls of each burner element forming between them a combined mixing and combustion chamber to which air is admitted through the perforations, of a gas-producing chamber situated between said burner elements and communicating therewith, means to feed oil to said gas-producing chamber, the lower end of the space between said burner elements being open to the atmosphere and the upper end being closed.

4. In an oil burner, the combination with burner elements, each presenting a trough-shaped base and a perforated wall rising from each side thereof, the perforated walls of each burner element forming between them a combined mixing and combustion chamber, of a gas-producing chamber situated between but extending to a lower level than said burner elements, means to feed oil to said gas-producing chamber, the lower side of the space between the burner elements being open to the atmosphere, and a closure for the top of said space, whereby air entering the space from its lower side will be heated and pass into the mixing chambers through the perforated walls.

5. In an oil burner, the combination with a burner element, a gas-producing element, a feed pipe to supply oil to the gas-producing element, said feed pipe having an exteriorly screw-threaded boss arranged at an angle thereto, an oil supply pipe screw-threaded to said boss, the latter having an opening in line with the bore of the feed pipe, which opening is closed by the supply pipe when screwed to the boss, said opening permitting a tool to be introduced into the bore of the feed pipe for cleaning the latter when the supply pipe is unscrewed from the boss.

6. In an oil burner, the combination with an annular burner, of an annular gas-producing chamber communicating therewith, a plurality of feed pipes for supplying oil to said chamber, said feed pipes all leading from a hollow exteriorly screw-threaded boss, a supply pipe screw-threaded to said boss, said boss having openings in its walls in alignment with the bores of the feed pipes, whereby when the supply pipe is disconnected from the boss a cleaning tool may be inserted into the interior of each feed pipe through the corresponding opening in the wall of the boss.

7. In an oil burner, the combination with a burner element presenting a trough-shaped base and perforated walls rising from the sides of the base and forming between them a combined mixing and combustion chamber which terminates at its top in an opening, of an elongated gas-producing chamber having an elongated trough-like base member and a cap member which forms the top of said gas-producing chamber, said cap member having a general triangular shape in section with the base of the triangle forming the top surface of the gas-producing chamber, and constituting a heat storage element which accumulates heat from the burner element and radiates said heat to the oil delivered to the gas-producing chamber.

8. Oil burning apparatus comprising an annular gas-producing chamber, inner and outer concentric annular combustion chambers spaced apart from the inner and outer walls respectively of said gas-producing chamber, each combustion chamber having perforated walls, conduits connecting the gas producing chamber to both of the combustion chambers, the perforations in the walls of each combustion chamber providing for the admission thereto of air which mixes with the vaporized oil to produce a combustible mixture.

9. Oil burning apparatus comprising a base member having inner and outer concentric annular trough-shaped gas-receiving channels spaced apart and opening upwardly, perforated walls extending upward from the side walls of said channels to form combustion chambers above and communicating with said channel, a gas-producing chamber situated between said channels and means acting to conduct vaporized oil from said gas-producing chamber to said channels.

10. A base element for oil burning apparatus comprising an annular gas-producing chamber, inner and outer trough-shaped gas-receiving circumferential channels spaced apart respectively from the inner and outer walls of said gas-producing chamber and conduits acting to conduct gas from said gas-producing chamber to said channels, said channels acting to feed gas to the burner elements of the apparatus.

11. Oil burning apparatus comprising an annular gas-producing chamber, inner and outer concentric annular combustion chambers spaced apart from the inner and outer walls respectively of said gas-producing chamber, conduits connecting the gas-producing chamber to both combustion chambers and through which vaporized oil is delivered from the gas-producing chamber to both of the combustion chambers, each combustion chamber having provision for the admission of air thereto, which mixes with the vaporized oil to form a combustible mixture.

GEORGE NORMAN ALBREE.